United States Patent [19]

Risberg

[11] 4,370,703
[45] Jan. 25, 1983

[54] SOLID STATE FREQUENCY CONVERTER

[75] Inventor: Robert L. Risberg, Milwaukee, Wis.

[73] Assignee: Park-Ohio Industries, Inc., Cleveland, Ohio

[21] Appl. No.: 285,355

[22] Filed: Jul. 20, 1981

[51] Int. Cl.³ ............... H02M 7/515; H05B 6/02
[52] U.S. Cl. .................... 363/136; 363/58; 363/71; 363/160; 219/10.77
[58] Field of Search ................ 363/55–58, 363/71–72, 96, 135–136, 160–162, 165; 361/89, 91, 75; 323/270–272; 219/10.75, 10.77

[56] References Cited

U.S. PATENT DOCUMENTS

| 3,290,581 | 12/1966 | Hooper | 373/71 |
|---|---|---|---|
| 3,328,596 | 6/1967 | Germann et al. | 307/12 |
| 3,506,907 | 4/1970 | Porterfield . | |
| 3,657,634 | 4/1972 | Eastop . | |
| 3,718,852 | 2/1973 | Bailey . | |
| 3,725,768 | 4/1973 | Pelly | 363/45 |
| 3,725,770 | 4/1973 | Bailey . | |
| 3,757,197 | 9/1973 | Bailey . | |
| 3,814,987 | 6/1974 | Chacon | 361/91 X |
| 3,913,000 | 10/1975 | Cardwell, Jr. | 363/101 X |
| 4,017,777 | 4/1977 | Bailey | 363/124 X |
| 4,039,926 | 8/1977 | Steigerwald . | |
| 4,047,092 | 9/1977 | Bendzsak . | |
| 4,195,233 | 3/1980 | Udvardi-Lakos . | |
| 4,244,015 | 1/1981 | Beebe . | |
| 4,245,291 | 1/1981 | Tsutsui . | |
| 4,247,890 | 1/1981 | Cutler . | |
| 4,253,140 | 2/1981 | McMurray . | |
| 4,258,416 | 3/1981 | Walker . | |
| 4,275,438 | 6/1981 | Stirniman . | |
| 4,280,038 | 7/1981 | Havas . | |
| 4,286,315 | 8/1981 | Johnson . | |
| 4,293,905 | 10/1981 | Opal . | |
| 4,296,462 | 10/1981 | Gurr . | |
| 4,312,031 | 1/1982 | Kudor . | |
| 4,323,958 | 4/1982 | Nowell . | |
| 4,323,959 | 4/1982 | Check . | |
| 4,325,112 | 4/1982 | Otsuka . | |

FOREIGN PATENT DOCUMENTS

| 1079363 | 6/1980 | Canada . | |
|---|---|---|---|
| 720638 | 3/1980 | U.S.S.R. | 363/71 |

OTHER PUBLICATIONS

Brainerd, Olson, Hooper, "Adding SCR's to Get High Power Means Smaller Transmitters", pp. 119–126, 6-1-3-66.

Primary Examiner—William M. Shoop
Assistant Examiner—Peter S. Wong
Attorney, Agent, or Firm—Meyer, Tilberry & Body

[57] ABSTRACT

A plurality of SCR diamond bridge circuits are coupled in series to generate frequencies higher than the individual operating frequencies of the SCR's. The series chain of diamond circuits is preferably coupled in parallel with the series combination of a DC blocking capacitor and an inductive load. The chain is provided with current from a substantially ripple-free constant current source, and the firing times of individual SCR's can be controlled to minimize the di/dt in each SCR.

12 Claims, 28 Drawing Figures

20Khz

20Khz

20Khz

20Khz

80Khz

FIG. 17
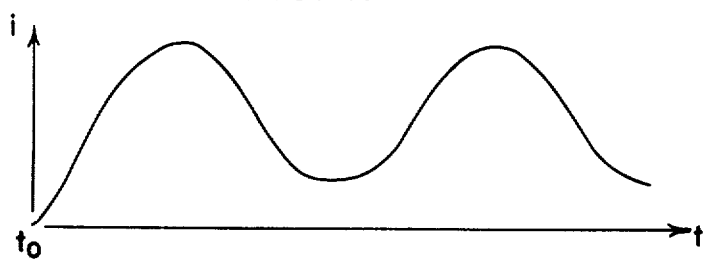
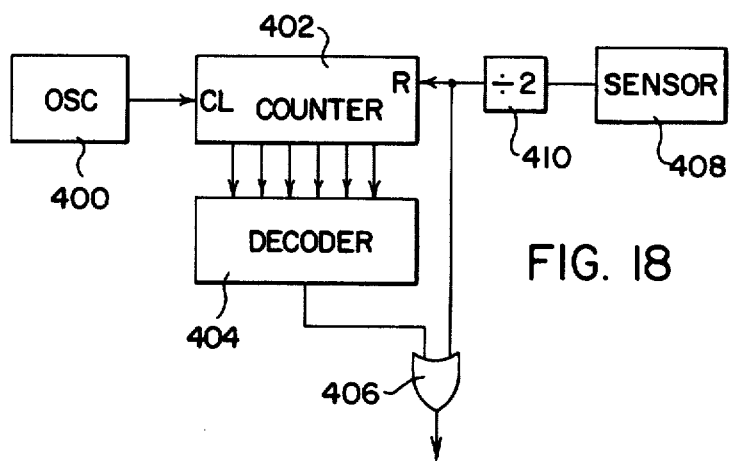
FIG. 18

SOLID STATE FREQUENCY CONVERTER

FIELD OF THE INVENTION

This invention relates to frequency conversion from a source frequency to a desired frequency, and more particularly from DC to a desired frequency.

Still more particularly, the present invention is directed to a solid state frequency converter which receives a constant DC current and generates electric power of a desired frequency and voltage to be supplied for use in an induction heating apparatus, induction melting apparatus, ultrasonic transducer or other devices requiring high frequency power.

BACKGROUND OF THE INVENTION

Frequency conversion through the use of electronic switches is widely known, and typical electronic switches have been spark gaps, thyratrons, vacuum tubes, transistors and thyristors. At the present time, thyristors are preferred for generating high frequency power up to 10 kHz due to their unlimited life, low cost and high energy switching capacity per switch.

A thyristor, or silicon controlled rectifier (SCR) will conduct in response to a control pulse when it is forward biased and will continue conducting until a reverse voltage is applied across the SCR. Systems employing SCR's in the kHz range are most often resonant circuits, wherein the requirement of the SCR to have a reverse voltage applied for approximately 10 to 60 microseconds in order to turn it off is met by the natural reversal of the current in the resonant circuit. A common circuit which operates in this manner is the series inverter shown in FIG. 1, wherein only the main power components are shown. When SCR's 10 and 12 are switched on, the series circuit consisting of the capacitor 14 and transformer primary 16 having a substantial leakage reactance is resonantly charged to approximately 1.5 to 2.0 times the source voltage. The capacitor then causes current to flow back to the source via diodes 18 and 20, thus causing SCR's 10 and 12 to turn off. When SCR's 10 and 12 have turned off, SCR's 22 and 24 are fired.

With a circuit operating in this manner, the turn off time available to the SCR's is only a fraction of one-half cycle of operation and, even if only a 10 microsecond turn off time is required, it is difficult to achieve frequencies in excess of 10 kHz.

Some variations of the circuit of FIG. 1, such as replacing diodes 18, 20, 26 and 28 with resonant LC networks, make it possible to turn off the thyristors with a reverse voltage which lasts longer than a half cycle of the resonant load, but the resonant load decays in amplitude before it can again be energized via SCR's 22 and 24. Induction heating devices preferably utilize 50 kHz power and, in such a case, the load would be a 50 kHz resonant circuit. If this resonant circuit is only supplied with a pulse of energy at a 10 kHz repetition rate, the voltage of the load will decay between pulses and optimum heating cannot be achieved.

A further approach to obtaining high frequency power is the use of a shunt commutated impulse circuit as shown in FIG. 2. In the circuit of FIG. 2, SCR's 30 and 32 conduct and charge the commutating capacitor 34. When a predetermined voltage is reached, the output SCR 36 is fired and the current source 38 feeds the load. At a subsequent time, SCR's 40 and 42 can be fired to connect the charged capacitor inversely in the circuit, thus reverse biasing the output SCR and terminating the pulse supplied to the load.

With the circuitry of FIG. 2, an output pulse can be achieved which is narrow enough to excite a high frequency tank circuit. However, a relatively long time must elapse while the commutating capacitor 34 charges up before the circuit can deliver another pulse and, therefore, the amplitude in the resonant load circuit will decay between pulses. By connecting a number of the FIG. 2 circuits in parallel, the tank load can be excited at the proper frequency, but each pulse will require a separate current source, separate output SCR and separate commutating circuit. This becomes excessively costly.

An additional problem with the circuit of FIG. 2 is that the commutating capacitor will only provide turn-off time to the output SCR as long as it is more negative than the tank circuit, but the tank circuit is ringing both positive and negative. As a result, lower operating voltages must be used in order to ensure sufficient turn-off time.

A further technique for generating high frequency power is disclosed in U.S. Pat. No. 3,290,581 to Hooper. As shown in FIG. 3 of that patent, a plurality of SCR diamond commutating circuits are used to achieve a type of frequency multiplication. Half of the diamond circuits are connected in parallel to one side of a transformer primary while the other half are connected in parallel to the other side of the transformer primary and the firing order of the diamond circuits can be shifted in phase so as to assist alternate and opposite directions of current flow through the primary. While the Hooper circuitry is an improvement over the previously discussed frequency generation circuits, it has still not proven entirely satisfactory. Turn off time is assured by virtue of firing alternate pairs of cross corner thyristors in a given diamond. If the cross corner pair is not immediately fired, the initial thyristor current will go to zero since the capacitor cannot conduct d.c. current. Turn off pulses are also supplied by virtue of adjacent diamonds, and after the adjacent diamonds have fired, the firing order returns to the initial diamond and the opposite cross corner pair is fired, thereby providing an additional turn off pulse to the initial pair considered. Thus, turn off time is no longer the limiting factor in the Hooper system. However, the diamonds and their capacitors are not used in a continuous current mode, nor are the primary windings of the transformer. Tuning out of inductance inherent in the construction of the equipment is not possible in discontinuous current. The Hooper system also employs a voltage source to supply energy to the diamond arrays and does not enjoy the protective advantages of being supplied with a current source, to be described.

Canadian Pat. No. 1,079,363 discloses a high frequency power generation circuit utilizing a plurality of diamond bridge circuits connected in parallel with one another and also in parallel with a load. While this may be preferable to the high frequency voltage generating circuits discussed above, it is still not entirely satisfactory at very high frequencies and high power, e.g. on the order of 100 kHz and 100 kW. Each diamond bridge circuit includes a commutating capacitor which must be repeatedly charged and discharged at currents well in excess of 1000 amperes, and at very high frequencies this charging and discharging may encounter substantial impedance from the panel inductance which is inherent in each of the diamond bridge circuits. Thus, with the circuit configuration illustrated in Canadian Pat. No. 1,079,363, the individual diamonds are not operating in continuous current, and the inductive impedance within the diamond in series with each capacitor cannot be tuned out. During conduction, voltage from the capacitor is lost in overcoming this inductive inertia, which is significant when only 5 or 10μseconds are available for delivering a high energy pulse. This situation is aggravated by the fact that thyristors are relatively high current low voltage devices, i.e. 1000 AMPS, 600 volts compared to vacuum tubes which may operate at 10,000 volts or higher. Thus, stray inductance which stores energy as $Li_2$ is a greater problem at high current and low voltage.

SUMMARY OF THE INVENTION

It is an object of this invention to provide an economical, high power, high frequency, solid state power source.

It is a further object of this invention to provide a high frequency power source which does not have its maximum frequency of operation determined by the turn-off time of the electronic switches used.

It is a further object of this invention to provide a high frequency inverter that is not susceptible to failure in the event synchronism with an oscillating tank circuit is lost due to load or transmission transients.

It is a further object of this invention to provide a high frequency inverter in which the possibility of damage to the switching elements due to current surge is substantially reduced.

It is a feature of this invention that a high frequency solid state power source is provided wherein the commutating capacitor is used for the dual purpose of commutating the switches and delivering a narrow resonant transmission half sine wave pulse to the load without jeopardizing the long turn-off time required by the thyristors.

It is a further feature of this invention that a high frequency inverter is provided having a self-protecting, self-firing network which precludes failure due to over voltage in the event control is lost upon power failure or the like.

It is a feature of this invention that a frequency converter is provided that can draw energy from power lines at unity power factor without causing interference with other electronic equipment on the power lines.

It is a further feature of this invention that the timing of the firing of individual switching elements is controlled in order to minimize current surge through the switching elements.

Briefly, these and other objects are achieved according to the present invention by a solid state frequency converter comprising a current source and a series chain of diamond commutating elements coupled to the current source. Each diamond element includes first and second SCR's having their anodes coupled together to form a diamond element input terminal, and third and fourth SCR's having their cathodes coupled together to form a diamond element output terminal. One terminal of a commutating capacitor is coupled in common to the cathode and anode of the first and third SCR's, respectively, and the other capacitor terminal is coupled in common to the cathode and anode of the second and fourth SCR's, respectively. A resonant load can either be coupled in series with the chain of diamond circuits, or it can be coupled in series with a DC blocking capacitor, with the series combination of the blocking capacitor and resonant load coupled in parallel with the diamond chain.

The voltage appearing across a single diamond group will be a sawtooth wave with a frequency equal to twice the switching rate of its SCR's. However, the voltage appearing across the series chain of N diamond bridge circuits will be a sawtooth having a frequency N times the frequency of each individual bridge. Since the turn-off time applied to each SCR is determined by the low frequency sawtooth of its own bridge, SCR's requiring long turn-off times, e.g., 40 microseconds, can be used to generate frequencies of 50 kHz or higher.

Reverse current spikes through individual SCR's can be prevented by including a small saturable reactor in series with each switching element so that the current during turn-off of the SCR will not be excessive. Further, the current through any individual SCR during its "on" time will fluctuate through more than one cycle of a substantially sinusoidal wave form. If the firing times of the SCR's are controlled such that each SCR will be fired when its forward current is at a minimum level, the turn-off time and di/dt will be minimized and damage to the SCR's can be reduced.

A substantially ripple-free source of constant current is provided to the diamond chain by first and second constant current sources each of which includes chopper SCR's fired at a submultiple of the firing frequency of the SCR's in the diamond chain. The choppers in the first constant current source are fired approximately 180° out-of-phase from those in the second constant current source in order to substantially eliminate ripple.

BRIEF DESCRIPTION OF THE DRAWINGS

The invention will be more clearly understood with reference to the following description in conjunction with the accompanying drawings in which:

FIG. 17 illustrates the wave form of forward current through an individual thyristor in a two-diamond configuration; and FIG. 18 is a brief diagram of suitable circuitry for controlling the timing of the firing pulses to individual thyristors.

DETAILED DESCRIPTION OF THE PREFERRED EMBODIMENTS

Figure 1:
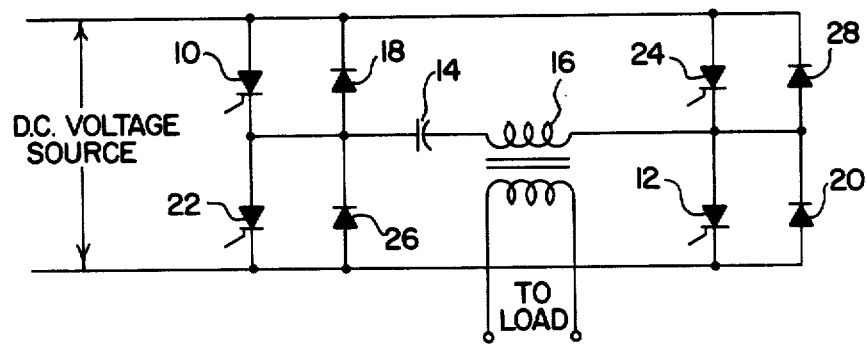
FIG. 1 is a brief diagram of the essential components of a conventional series inverter circuit.
Figure 2:
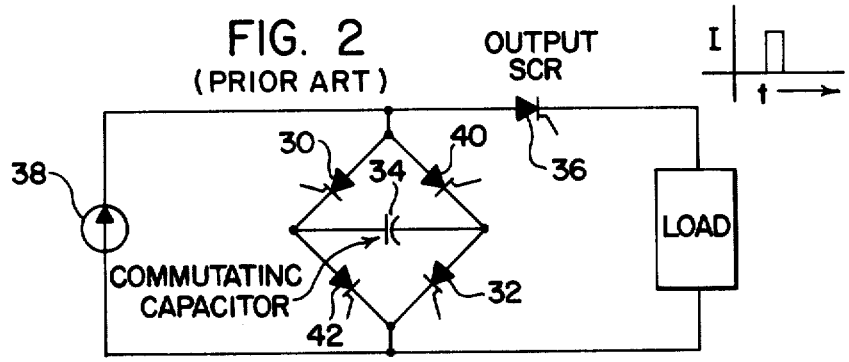
FIG. 2 is a brief diagram of a conventional shunt commutated impulse circuit.
Figure 3:
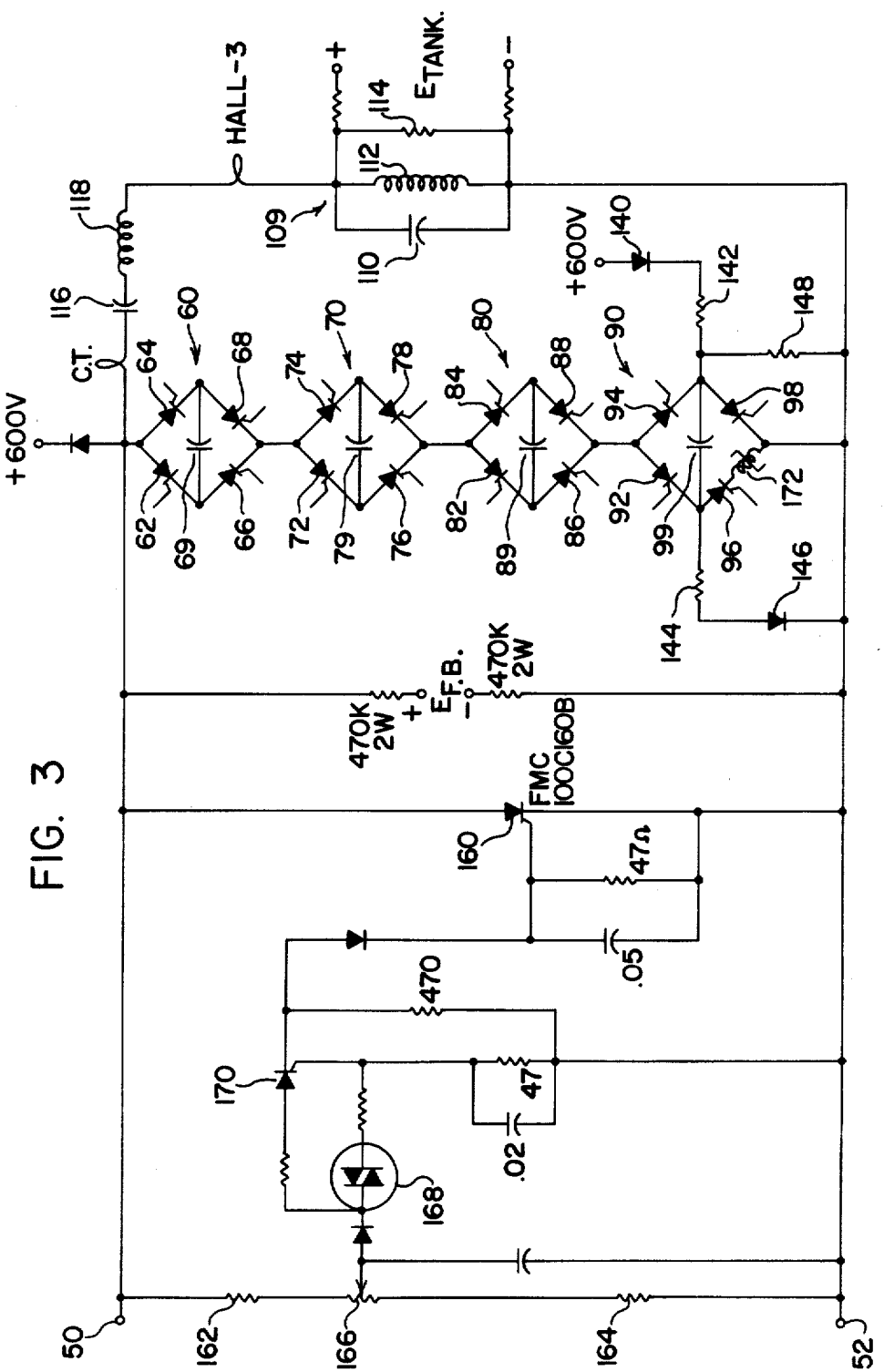
FIG. 3 is a schematic diagram of a frequency converter circuit according to the present invention.

Shown in FIG. 3 is a brief schematic diagram of the essential components of a frequency converter according to the present invention. The circuit includes a constant current source (not shown), and coupled across the output terminals 50 and 52 of the constant current source 50 is a series chain of diamond bridge circuits 60, 70, 80 and 90. Diamond circuit 60 comprises SCR's 62, 64, 66 and 68 and an internal commutating capacitor 69 and the remaining diamond circuits are similarly configured. As is well known, each diamond inverter group is normally operated by simultaneously firing opposite SCR's. For example, SCR's 62 and 68 will conduct during a first period of time followed by SCR's 64 and 66.

Figure 4A:
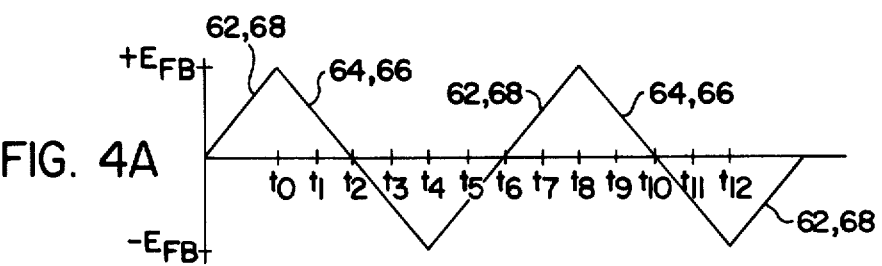
FIGS. 4A and 4B are wave forms illustrating the operation of any one of the individual diamond circuits in FIG. 3.

For the purpose of the following description, it will be assumed that the SCR's in each diamond inverter group are pulsed at their maximum switching frequency, e.g., 10 kHz. With this type of operation, the voltage across the capacitor 69 in bridge 60 will be switched at a 10 kHz rate and is illustrated in FIG. 4A. While SCR's 62 and 68 are conducting, the capacitor 69 will be gradually charged with plus on the left and minus on the right, and when the SCR's 64 and 66 are conducting the capacitor 69 will gradually be charged to the opposite polarity with plus on the right and minus on the left. When SCR's 64 and 66 are turned on, SCR's 62 and 68 will be reverse biased for the period of time required for capacitor 69 to change back to a "zero" potential, i.e., from time $t_0$ to time $t_1$ in FIG. 4A which is about 25 microseconds.

Figure 4B:
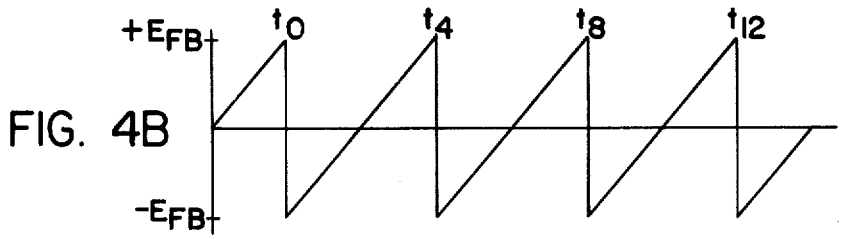

While the potential across commutating capacitor 69 changes at a 10 kHz rate as shown in FIG. 4A, the potential as viewed from the top and bottom terminals of the diamond bridge 60 will be as shown in FIG. 4B. Each time the conductions of the SCR's are switched, the capacitor will instantaneously be connected in reverse polarity and will then gradually charge to the proper positive polarity at which time the conductions will again be switched. As can be seen from a comparison of FIGS. 4A and 4B, the potential at the top and bottom terminals of the bridge circuit 60 will switch at a 20 kHz rate even though the switching frequency of the individual SCR's is only 10 kHz.

Figure 5A:
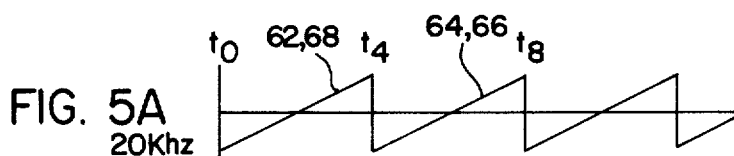
FIGS. 5A-5E are wave forms illustrating the combined operation of the diamond circuits in FIG. 3.
Figure 5B:
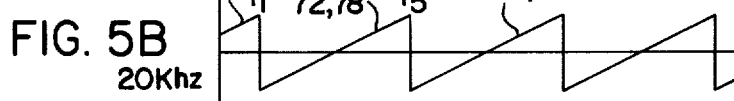
Figure 5C:
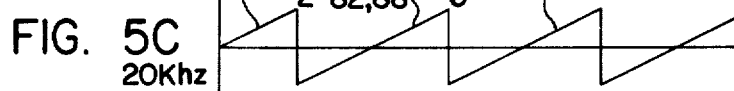
Figure 5D:
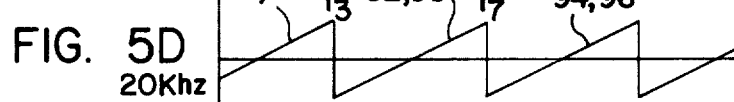
Figure 5E:
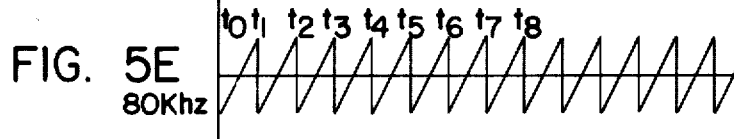

In the next bridge 70, SCR's 72 and 78 are conducting during a first period and SCR's 74 and 76 are conducting during a second period in the same manner as in bridge circuit 60. If the firing times of the SCR's in respective bridge circuits 60, 70, 80 and 90 are phase-displaced by 90°, the voltages as seen from the top and bottom (input and output) terminals of each of the respective bridge circuits will be as shown in FIGS. 5A–5D. Since these diamond bridge circuits are connected in series, their top-to-bottom voltages will be added and the voltage as seen from the input to inverter 60 to the output of inverter 90 will be as shown in FIG. 5E and will have a frequency of $4 \times 20$ kHz = 80 kHz. The ramp in FIG. 5E is four times as steep as the voltage ramp for any individual bridge, since the series chain of four equal capacitors 69, 79, 89 and 99 will have an effective capacitance of one-fourth that of any individual capacitor. Thus, although no switching element operates at a rate greater than 10 kHz, an 80 kHz supply is generated.

Although four diamond circuits have been used in the embodiment shown, it should be appreciated that the principles of the present invention are applicable to any series connection of N diamond circuits, where N is any integer greater than 1. The firing of each diagonally opposite pair in any one diamond circuit would be substantially simultaneous and 180° out-of-phase with the firing of the opposite diagonal pair, and the firing times of corresponding thyristors in different diamond circuits would be phase-offset by 180°/N. The resulting frequency would then be 2 N times the operating frequency of any individual thyristor.

In the embodiment of FIG. 3, the high frequency voltage across the series chain is used to drive a tank circuit load 109 represented by capacitor 110, inductor 112 and resistor 114. The high frequency voltage is coupled to this resonant load through capacitor 116 and a transmission inductance 118. Capacitor 116 is a DC blocking capacitor and should have a value larger than the equivalent capacitance of the diamond chain, and inductor 118 should be matched to the equivalent capacitance of the diamond chain so that they will ring together at approximately the resonant frequency of the tank circuit 109. Thus, a resonant half sine wave pulse will be supplied to the tank circuit each time one of the bridges is switched. It should be appreciated that the presence of capacitor 116 and inductor 118 will slightly distort the linear charging of the capacitors shown in FIGS. 4 and 5, but the overall operation is essentially unchanged.

The frequency at the load will be relatively high and it is therefore necessary to compensate for inductance that exists between the frequency converter and the load. Further, the load is often an inductive load such as a coil. Since this load may be as much as 25 feet or more away from the power supply, the tank circuit 109 is provided to reduce the volt amperes that must be delivered from the power supply to the work coil. The leading power factor current of the capacitors in parallel with the load cancels all of the inductive current drawn by the coil. The power supply will then see only the resistive component of the load which is 5 percent of the coil volt amperes, so that the SCR's need only be 5 percent as large as they would be with no load capacitors.

As described above, it is desirable to excite the resonant tank circuit on a regular basis with a relatively narrow current pulse. However, as a practical matter, the available voltage and the minimum transmission inductance are such that it is not possible to create large discontinuous current pulses without excessive voltage, and this is especially true at higher power levels. The half sine wave current pulse created by the frequency converter system according to the present invention has a characteristic impedance of:

$$Z = \sqrt{\frac{L}{C}},$$

where C is the equivalent capacitance of the diamond chain. C must be fairly large in order to store high energy because the voltage is limited by the SCR's to a range of 600 to 1000 volts divided by a safety factor. Given such a commutating capacitance, L must be extremely low to create a transmission pulse that is narrow, i.e., a sine wave half-cycle whose natural frequency is:

$$f = \frac{1}{2\pi \sqrt{LC}}$$

For example, to create a half sine wave pulse of current which is 10 microseconds wide with an equivalent capacitance of 10 microfarads requires a total construction and transmission inductance of 1 microhenry. This satisfies a 50 kHz load. At 100 kHz and the same power, the equivalent C is 5 $\mu$fd and L is 0.5 $\mu$H. Such a low inductance is difficult to achieve.

Instead, with the DC blocking capacitor 116, a continuous sine wave current through the diamond chain panel inductance, the transmission inductance 118 and blocking capacitor 116 and the diamond chain equivalent capacitance can be generated since the normal reactance $$X_L = j\omega L$$

is compensated by $$X_C = (1/j\omega C)$$

Thus, by operating the diamond chain in continuous current a full sine wave current flows by superposition through the diamond chain. The current is an 80 kHz wave in the case of 4 diamonds with SCR's fired at 10 kHz, the 80 kHz current reduces the total current through the SCR's to near zero prior to firing of any SCR, reducing switching losses.

In preparation for start-up, all of the SCR's on the left-hand side of the bridge circuits are turned on and the commutating capacitors 69, 79, 89 and 99 are all charged with a higher potential on the right and a lower potential on the left. The charging of these capacitors is accomplished via resistive charging circuits coupled between the positive and negative d.c. bus lines. For example, capacitor 99 is charged through diode 140, resistor 142, resistor 144 and diode 146. The voltage on the right-side of capacitor 99 will be determined by the voltage divider comprising resistors 142 and 148, and the potential on the left-hand side of capacitor 99 will be substantially the potential of the negative bus line 52. Similar charging circuits are coupled to the remaining three capacitors 69, 79 and 89, but these have been omitted from FIG. 3 in the interest of simplification.

When the inverter is started, SCR's 62 and 68 will be fired discharging the charge on the right side of capacitor 69 through the conducting SCR's on the left sides of each of bridge circuits 70, 80 and 90. The negative potential on the left side of capacitor 69 will instantaneously drag down the potential on line 50, and this potential will then be gradually replenished by the constant current source. Once the capacitor 69 has become fully charged with positive on the left and minus on the right, SCR's 64 and 66 could be fired to reverse the process, and the resulting potential on line 50 would be substantially as shown in FIG. 4B. However, the operation of the remaining bridge circuits 70, 80 and 90 will further increase the resulting frequency as will now be described.

After SCR's 62 and 68 have been fired at time $t_0$, SCR's 72 and 78 are fired 45 degrees later and the positive charge on the right side of capacitor 79 is discharged to the negative bus line 52 while the negative charge on the left side of capacitor 79 will instantaneously drop the potential on the positive bus line 50 through conducting SCR's 72, 68 and 62 and capacitor 69. This results in a drop of the voltage on the positive bus at time $t_1$. At time $t_2$ SCR's 82 and 88 are fired, and at time $t_3$ SCR's 92 and 98 are fired. The second half of the cycle begins at time $t_5$ when SCR's 64 and 66 are fired discharging the positive charge on the left side of capacitor 69 through the lower three bridge circuits and instantaneously coupling the low potential on the right side of capacitor 69 to the positive bus through the conducting SCR 64. SCR's 74 and 76, 84 and 86, and 94 and 96 are subsequently fired at 45 degree intervals as in the first half cycle of operation, and the result is a potential across the upper and lower terminals of the diamond change which appears as shown in FIG. 5E.

Each thyristor firing results in a full sine wave pulse which is fed to the tank load. During the first half cycle the current from the source and the load flow through the diamond chain. During the second half cycle the load current subtracts from the d.c. current source reducing the net thyristor current to near zero. The tank circuit rings with a very nearly symmetrical sine wave. As shown in FIG. 4B, the turn-off time provided for each diamond SCR is the period of time during which the voltage of FIG. 4B is negative. With four diamond circuits being used as in FIG. 4, the frequency of each diamond bridge will be one-fourth of the frequency of the tank circuit, and the turn-off time for each SCR will thus be two complete cycles of the tank circuit oscillation. For example, if the turn-off time required for each SCR is 40 microseconds, the tank cycle can be 20 microseconds, or 50 kilocycles. If the SCR turn-off time requirement is only 15 microseconds, e.g., with GE C394 SCR's, four series-connected diamond bridges can generate a tank frequency of (1/7.5)=133 kHz.

Since the circuitry of FIG. 4 permits such a long turn-off time, even with an open circuit or a short circuit, or a purely resistive, inductive or capacitive load, the inverter SCR's are assured of adequate turn-off time.

The inverter circuit of FIG. 3 is intended to operate with a d.c. bus voltage of between 600 and 1,000 volts. However, it is possible that some malfunction may result in an over voltage on the positive bus line, e.g., a discontinuity in the diamond chain current, and such an over voltage may damage the SCR's in the diamond chain. Accordingly, over voltage protection circuitry is provided in the form of an additional SCR 160 which will turn on and short out the positive and negative bus lines whenever the voltage between those two lines exceeds a predetermined value. A voltage divider formed by resistors 162 and 164 and potentiometer 166 determines the value at which the SCR 160 will turn on. When this excessive level is reached, diac 168 will fire thereby turning on SCR 170 which, in turn, will trigger SCR 160. SCR 170 will never be reverse biased and will maintain SCR 160 in conduction even if the bus potential subsequently decreases to an acceptable level.

Although shown only in connection with SCR 96, it should be noted that small ferrite saturating reactors 172 are provided in series with all SCR's in the diamond chain. The primary purpose of each such saturating reactor is to limit the reverse current through the SCR's when an event occurs which creates a reverse voltage across these devices. For example, when SCR's 64 and 66 are fired, the voltage stored on capacitor 69 is instantaneously connected in reverse polarity across SCR's 62 and 68, and it is possible that a high current spike could damage these SCR's unless the saturable reactors are provided.

Although in the above description the resonant load is to be pulsed once during every oscillation cycle by firing diagonally opposite SCR's in each bridge, it is also possible to hold the charge on some or all of the bridge capacitors by firing only one SCR of a particular bridge. For example, in FIG. 3, SCR's 64 and 66 may have charged their capacitor with a plus potential on the right and minus on the left, and if only SCR 62 is subsequently fired, SCR 64 will be turned off and SCR's 62 and 66 will conduct. The positive charge on the right side of capacitor 69 will be held and the source current will be provided to the remaining bridges via SCR's 62 and 66. In this manner, energy sent to the tank circuit may be quickly started or stopped, or a pulse can be delivered every second or third oscillation of a very high frequency tank. If the commutating capacitances and transmission inductance are selected such that the half sine wave pulse is very narrow, a very high frequency tank can be used while maintaining even lower SCR switching speeds.

Figure 6:
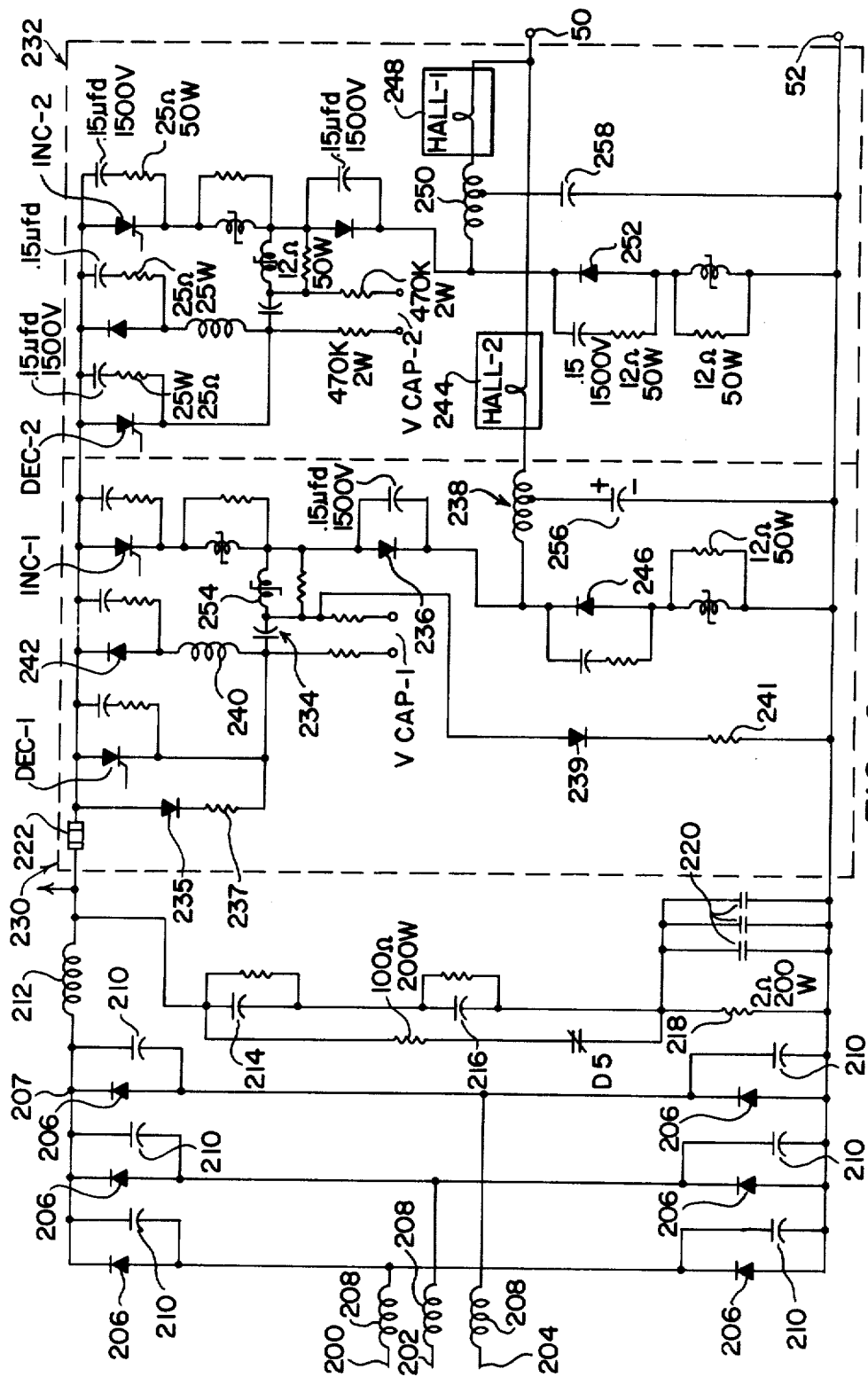
FIG. 6 is a schematic diagram of a source of constant current suitable for use in conjunction with the frequency converter circuit of FIG. 3.

The constant current source which feeds line 50 and 52 may be any one of a wide variety of known sources, but a current source found particularly suitable for the inverter circuitry of the present invention is shown in FIG. 6. Three-phase power is supplied to terminals 200, 202 and 204, and this three-phase voltage is supplied through rectifying diodes 206 to an upper line 207 and the negative DC bus line 52. The input line reactors 208 and the small capacitors 210 in parallel with each of the rectifying diodes are provided for the purpose of suppressing transients which may occur due to other equipment connected to the power lines. The voltage on line 207 is coupled through inductor 212 to one side of d.c. bus capacitor 214. DC bus capacitors 214 and 216 are then charged via resistor 218 for a short period of time after which switch contacts to 220 are connected to short out the resistor 218, leaving a substantially constant 600 volt potential on the left side of fuse 222.

The constant current source of FIG. 6 includes two different circuits 230 and 232 each of which essentially comprises a separate constant current source, and the two circuits are operated at a substantially 90 degree phase difference to minimize ripple in the current supplied.

Initially, control circuitry to be described in more detail later prevents firing of INC-1 until commutating capacitor 234 is fully charged. With both INC-1 and DEC-1 non-conducting, the capacitor 234 is charged through diode 235 and resistor 237 from the positive bus line and diode 239 in resistor 241 to the negative bus line. When the potential across capacitor 234 reaches a predetermined level with plus on the left and minus on the right, INC-1 is fired and current is supplied through diode 236 and inductor 238 to the current source output terminal 50. At this time, the positive charge on the left side of commutating capacitor 234 is wrung around through inductor 240 and diode 242 until capacitor 234 reaches a charging state with plus on the right side and minus on the left side.

Current through the main inductor 238 is measured by current measuring device 244 (HALL-2). The sensed current is fed to a current regulator which controls the on off ratio of INC conduction time within a carrier frequency period which is a submultiple of the high frequency inverter frequency. A control circuit fires DEC-1 and the capacitor 234 attempts to discharge backward through INC-1, thereby turning off INC-1. With DEC-1 conducting, the positive charge on the right side of capacitor 234 will then discharge through the main inductor 238.

When the charge on the capacitor 234 decreases to the level of the negative bus, current will continue to flow through inductor 238 and will be provided by the freewheeling, diode 246. With DEC-1 conducting and INC-1 non-conducting, the current supplied through inductor 238 will begin to decay until it reaches a predetermined value below the desired constant current, at which time INC-1 will again be fired and the cycle will be repeated.

The circuit 232 functions in a substantially identical manner with the firing of INC-2 and DEC-2 being controlled in accordance with the current level detected by current monitor 248 (HALL-1). The operation of circuits 230 and 232 are maintained substantially 90 degrees out-of-phase so that the current at the output of inductor 238 will be increasing while the current at the output of inductor 250 is decreasing, and vice versa, and the two current outputs are superposed on one another at the output terminal 50.

As described above, small saturable reactors are provided in series with all SCR's and in series with freewheeling diodes 246 and 252 in order to prevent instantaneously large reverse currents from burning out the semiconductors. For example, when INC-1 is fired, the free-wheeling diode 246 becomes reverse biased and, since the diode does not immediately block reverse voltage, something is needed to limit the reverse current for a few microseconds. Similarly, the saturable reactor coupled to the cathode of INC-1 limits the reverse current through INC-1 when DEC-1 is fired, and saturable reactor 254 will limit the reverse current through DEC-1 when INC-1 is fired.

Capacitors 256 and 258 are provided for the purpose of over voltage protection and also serve to some extent to further reduce the ripple in the constant current. For example, if a back emf is generated at terminal 50 due to some occurrence at the load or some loss of synchronization, the current being supplied through inductor 238 will generate a very high voltage at terminal 50 which may damage the diamond chain. Accordingly, capacitor 256 is coupled between the two inductors $238_1$ and $238_2$, and the size of capacitor 256 is made very large so that it is capable of absorbing a substantial charge without generating an excessive voltage. Capacitor 258 functions in a similar manner.

FIGS. 7-16 illustrate control circuitry for operating the inverter shown in FIG. 3 and the constant current source of FIG. 6.

Figure 7:
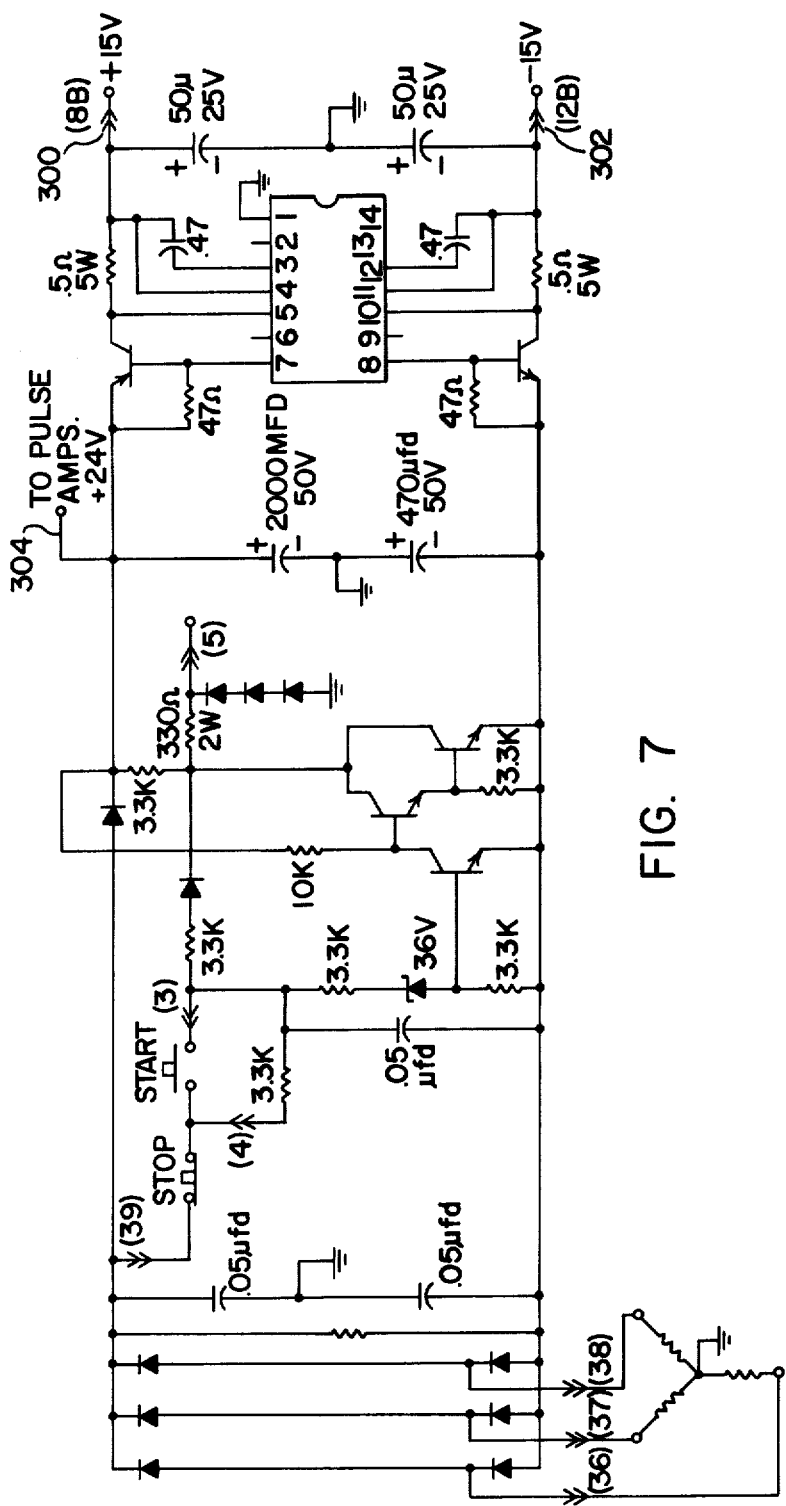
FIG. 7 is a schematic diagram of a suitable power source for the switching elements and for the timing and logic circuitry for controlling the firing times of the switching elements in FIGS. 3 and 6.

FIG. 7 illustrates one example of power supply circuitry which can be used to generate supply voltages for the control circuitry. Substantially regulated ±15 v is generated at the output terminals 300 and 302, and a filtered +24 v supply for the SCR pulse amplifiers is provided at terminal 304.

Figure 8:
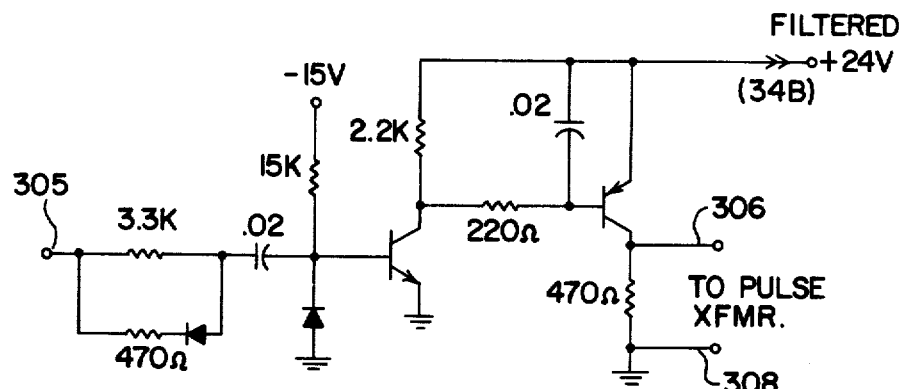
FIG. 8 is a schematic diagram of a pulse amplifier which may be used to trigger the switching elements used in the present invention.

FIG. 8 illustrates a typical pulse amplifier used to generate firing pulses for each of the SCR's. A separate pulse amplifier such as that shown in FIG. 8 will be required for each SCR in the system, and a pulse signal received at input terminal 305 will be amplified and supplied from output terminals 306, 308 to a well-known pulse transformer which, in turn, will supply the firing pulse to the appropriate SCR.

Figure 9:
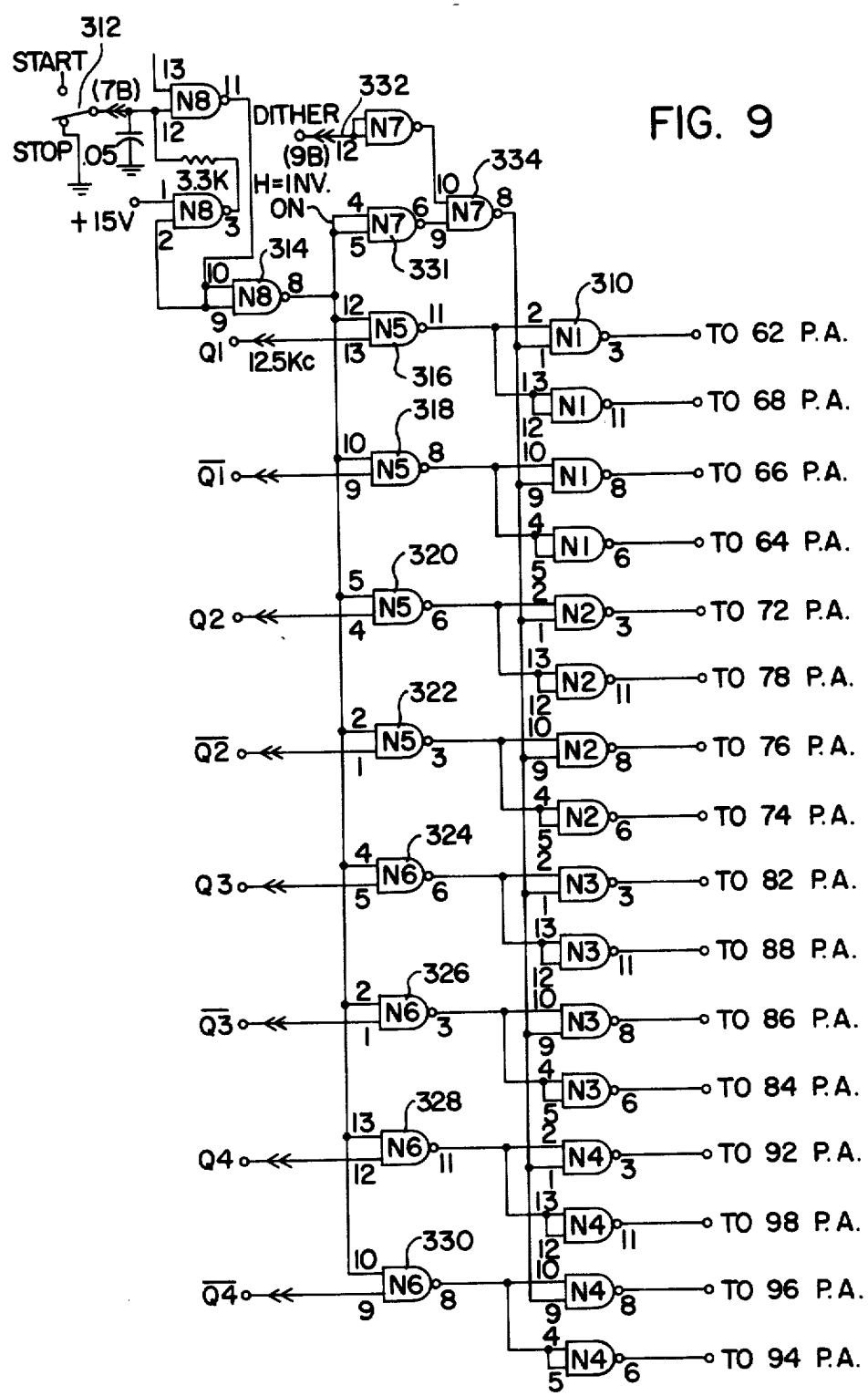
FIG. 9 is a schematic diagram of logic circuitry used in controlling the firing times of the switching elements in FIG. 3.

FIG. 9 illustrates logic circuitry for delivering the timing pulses to the appropriate SCR pulse amplifiers, with the outputs of NAND gates 310 being coupled to the pulse amplifier input 305 (FIG. 8) of an appropriate SCR. When the inverter is off, switch 312 is in its downward position as shown, and the output of NAND gate 314 is low. This will result in a high level output from each of NAND gates 316-330. A low level signal at the output of gate 314 will also result in a high level output from gate 331, so that a dither signal applied to terminal 332 will be passed through gate 334. This dither signal will be passed through alternate NAND gates 310 to maintain all SCR's on the left side of the diamond chain in conduction. The dither signal is synchronized with the firing times of the INC and DEC SCR's in each constant current circuit so that a conduction path for the SCR's is maintained.

Figure 11:
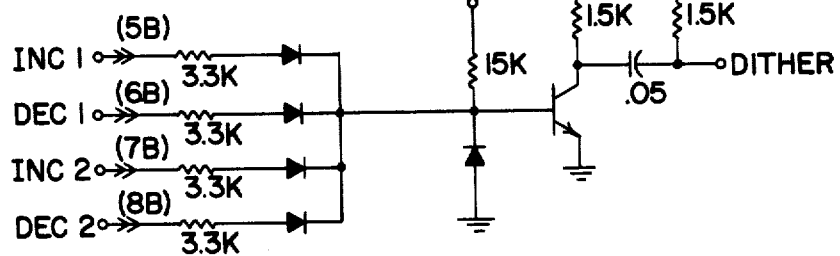
FIG. 11 is a schematic diagram of a dither circuit used to maintain the frequency converter circuitry of FIG. 3 in a standby condition.

The dither signal to terminal 332 in FIG. 9 can be provided by a simple oscillator circuit such as shown in FIG. 11 which is driven by the firing of the current source chopper SCR's.

When the inverter is turned on, the switch 312 is moved to its upward position and a high level signal will be present at the output of gate 314, thus blocking the dither and maintaining a constant high level output signal from gate 334. Under this condition, the firing of opposite SCR's 62 and 68 will be determined by the lower input to NAND gate 316, the firing of opposite SCR's 64 and 66 will be determined by the signal applied to the lower input of NAND gate 318, etc., with diagonally opposite SCR's in each diamond (e.g., SCR's 62 and 68) always being fired simultaneously. In the embodiment shown, each of gates 316-330 is provided with a 12.5 kHz signal with the signals applied to gates 316 and 318, 320 and 322, 324 and 326, and 328 and 330 being 180 degrees out-of-phase with respect to one another and the signals applied to gates 316, 320, 324 and 328 being successively offset by 45 degrees with respect to one another as described above in connection with FIG. 3.

Figure 10A:
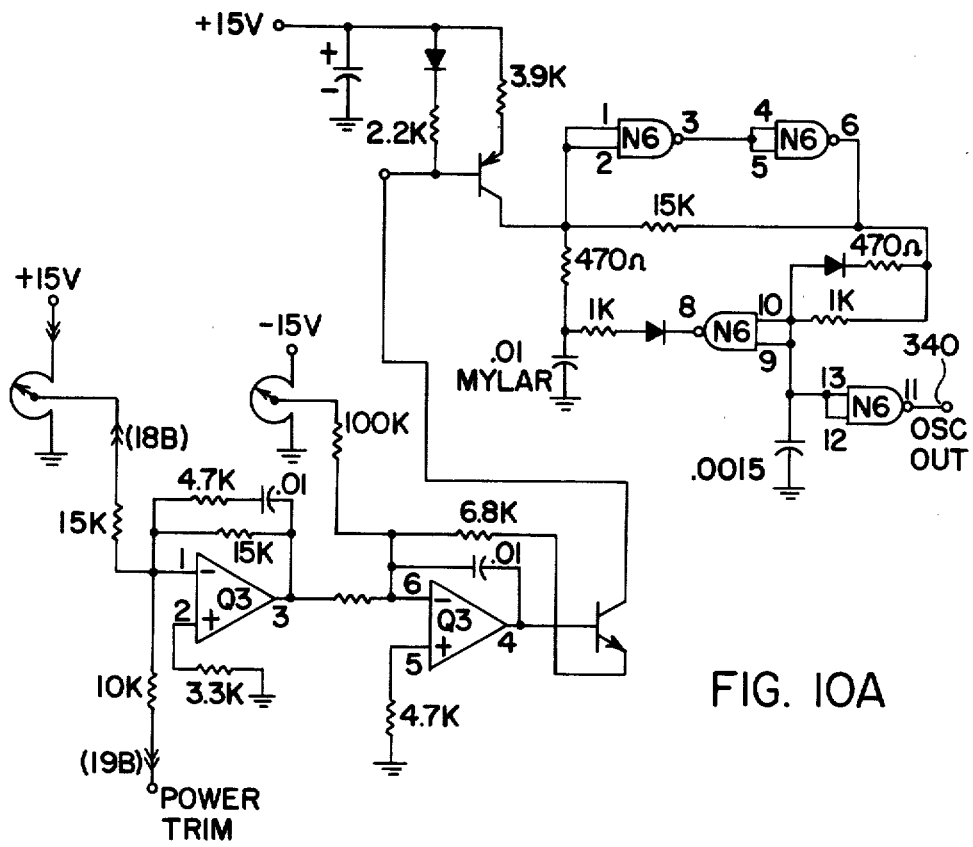
FIG. 10A is a schematic diagram of an oscillator for use in control circuitry of the present invention.
Figure 10B:
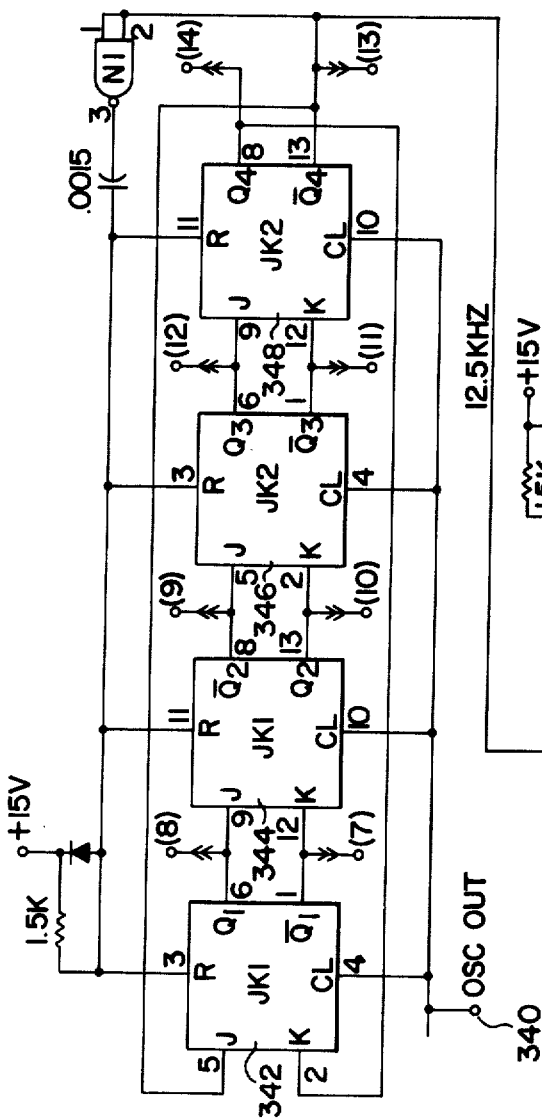
FIG. 10B is a schematic diagram of a frequency divider which, in conjunction with the oscillator of FIG. 10A, provides phase-displaced timing signals necessary to implement proper firing times of the switching elements in FIG. 3.
Figure 10B:
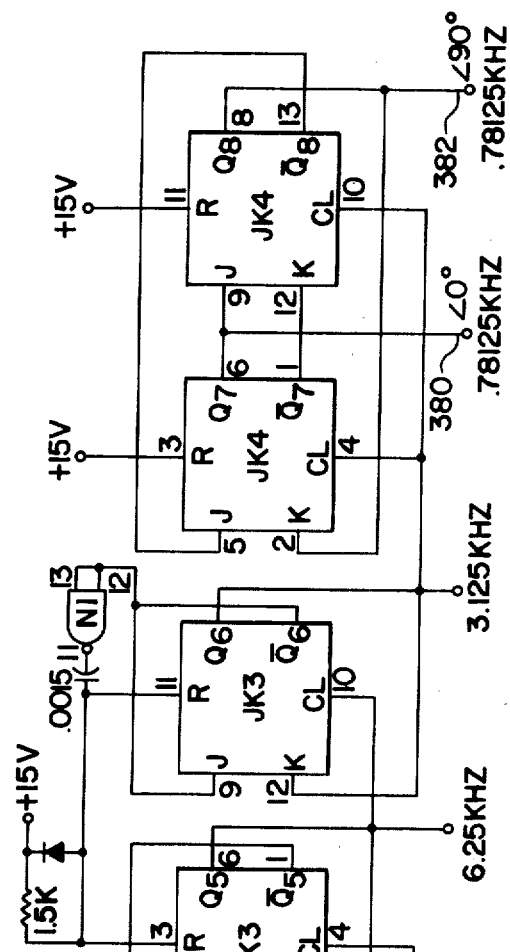

FIGS. 10A and 10B illustrate oscillator and divider circuitry which may be used to supply the enabling signals to gates 316-330. FIG. 10A illustrates a high frequency oscillator which provides a 100 kHz signal at its output terminal 340, and this signal is used to clock four JK flip-flops 342, 344, 346 and 348. With the circuitry connected as shown, the output of each of the four flip-flops will change at a 12.5 kHz rate and the Q and $\bar{Q}$ outputs of each flip-flop will be 180 degrees out-of-phase. Accordingly, the $Q_1$ and $\bar{Q}_1$ outputs of flip-flop 342 can be provided to gates 316 and 318, respectively, the $Q_2$ and $\bar{Q}_2$ outputs of flip-flop 344 can be supplied to gates 320 and 322, respectively, etc.

Figure 12A:
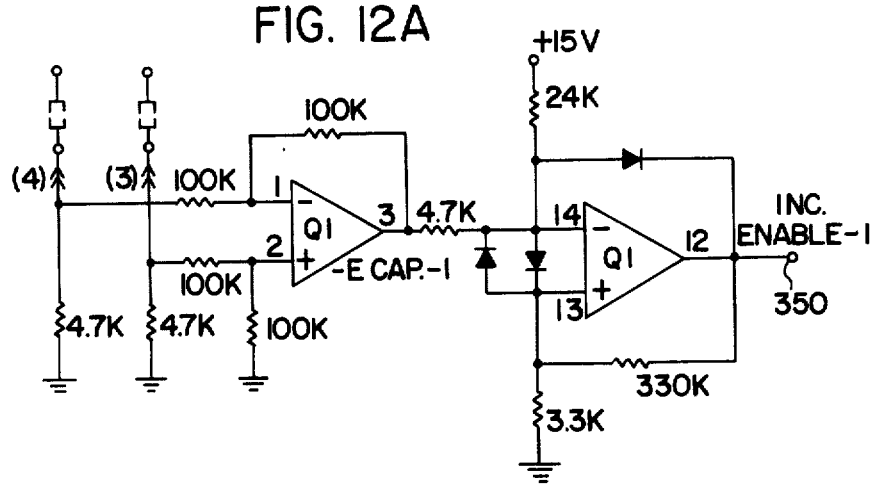
FIGS. 12A and 12B are schematic diagrams of chopper enabling circuits for the first and second constant current sources, respectively.
Figure 12B:
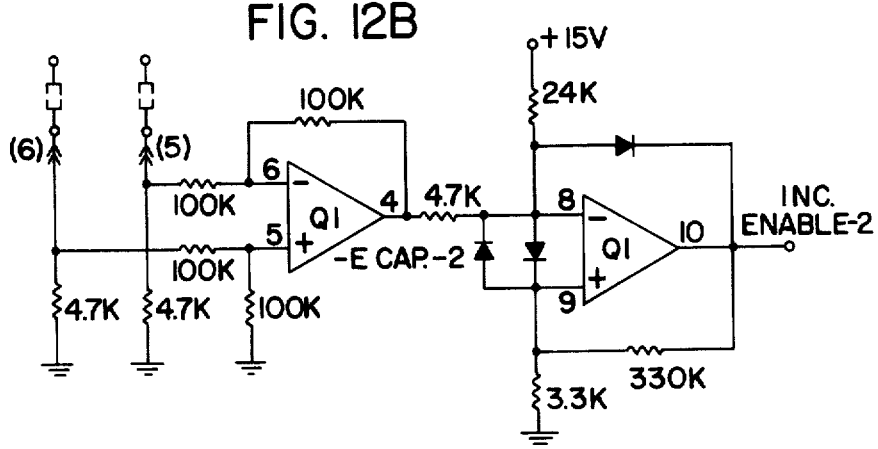

FIG. 12A illustrates a circuit suitable for detecting the voltage across capacitor 234 in FIG. 6. When the voltage reaches a predetermined level, an enabling signal is provided at terminal 350 so that INC-1 may be fired when appropriate. An identical voltage detection and INC-2 enabling circuit as shown in FIG. 12B are provided in the second portion 232 of the constant current supply.

Figure 13A:
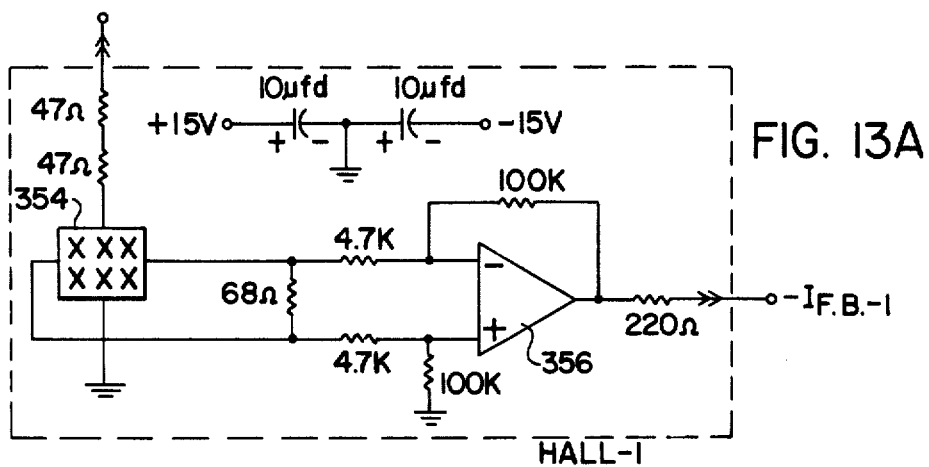
FIGS. 13A and 13B are schematic diagrams of current monitoring circuits used in the first and second constant current sources of FIG. 6.
Figure 13B:
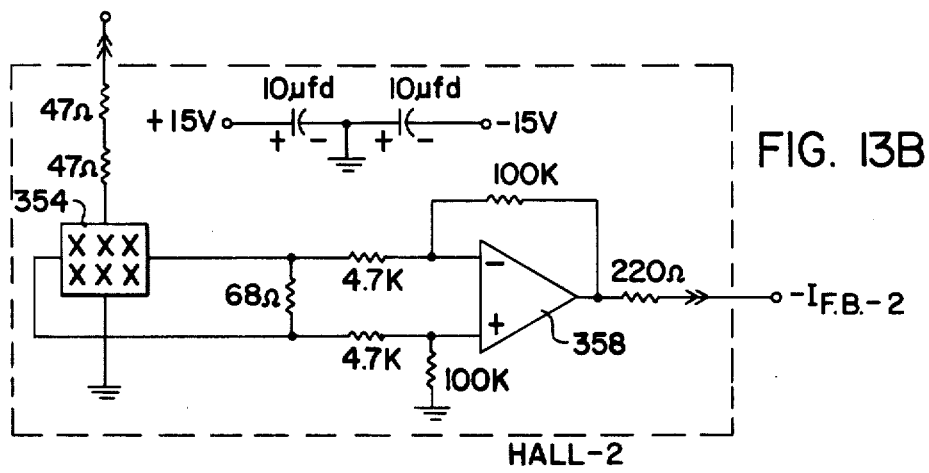

FIGS. 13A and 13B illustrate suitable current detection circuits 248 and 244, respectively, of FIG. 6. A small semiconductor element, e.g., indium phosphide, 354 will measure the flux in the air gap of a small core and generate a corresponding voltage which is applied to the input terminals of an operational amplifier. The signal at the output of amplifier 356 in FIG. 13A will be proportional to the current supplied through inductor 250 to the output terminal 50 in FIG. 6, and the signal at the output of amplifier 358 in FIG. 13B will be proportional to the current supplied through inductor 238 to the output terminal 50 in FIG. 6.

Figure 14:
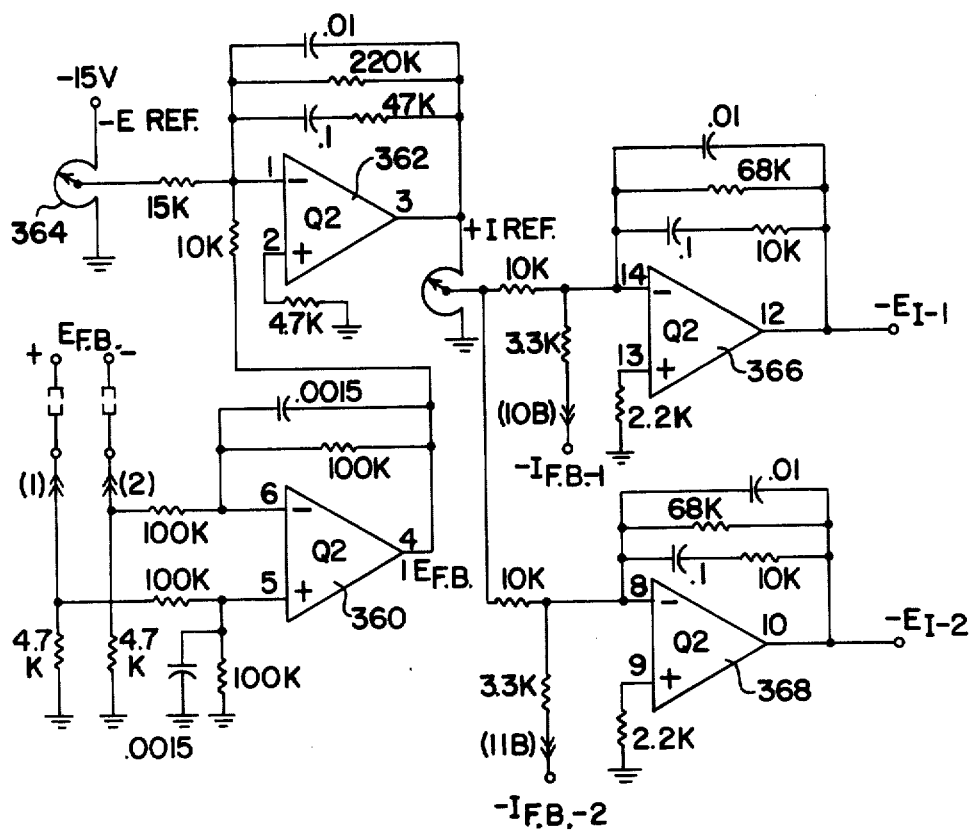
FIG. 14 is a schematic diagram of feedback circuitry which assists in controlling the value of constant current in accordance with the levels of current supplied by each of the constant current sources and in accordance with the voltage across the diamond chain of FIG. 3.

FIG. 14 illustrates feedback circuitry for controlling the firing times of the current source chopper SCR's. Amplifier 360 provides an output proportional to the voltage $E_{FB}$ across the diamond chain in FIG. 3. This is compared in amplifier 362 with a reference potential from potentiometer 364, and the output of amplifier 362 is thus proportional to the difference between the desired and actual potential across the inverter. A portion of this signal is compared in amplifier 366 with an output from current sensor 248 in FIG. 6, and is also compared in amplifier 368 with an output from current sensor 244 in FIG. 6. The outputs of these two amplifiers 366 and 368 constitute error signals for indicating when the current provided through either of circuits 232 or 230, respectively, should be increased or decreased.

Figure 15A:
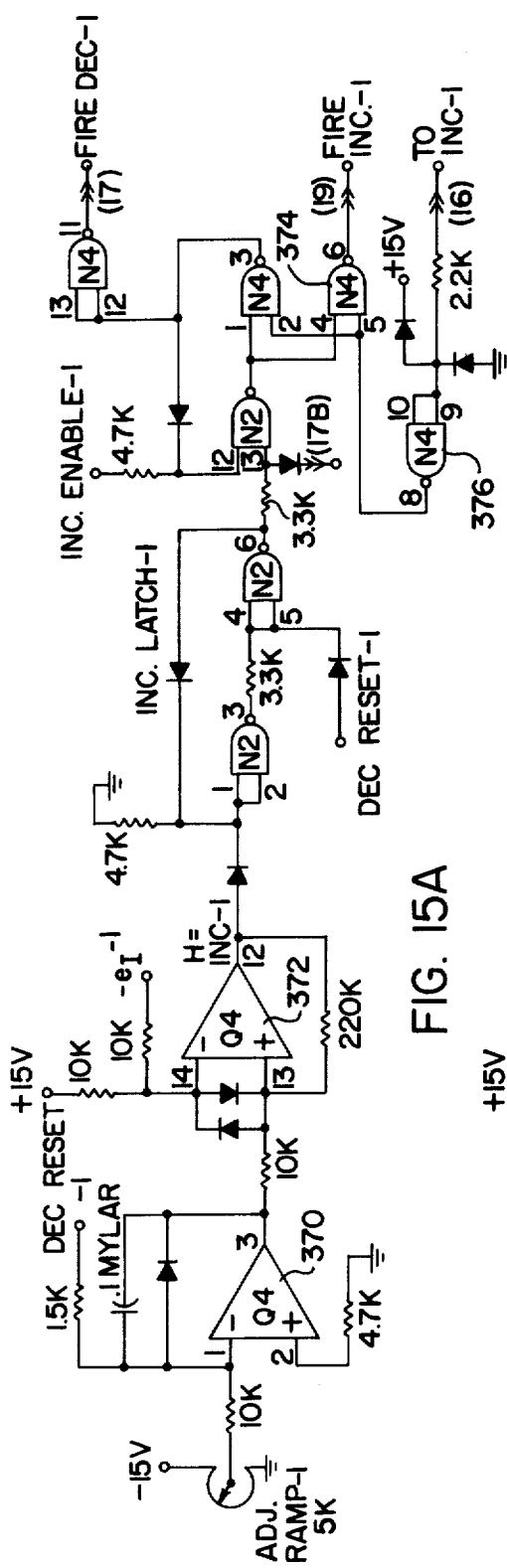
FIGS. 15A and 15B are schematic diagrams of circuitry used to generate firing signals for the chopper SCR's in the first and second constant current sources.
Figure 15B:
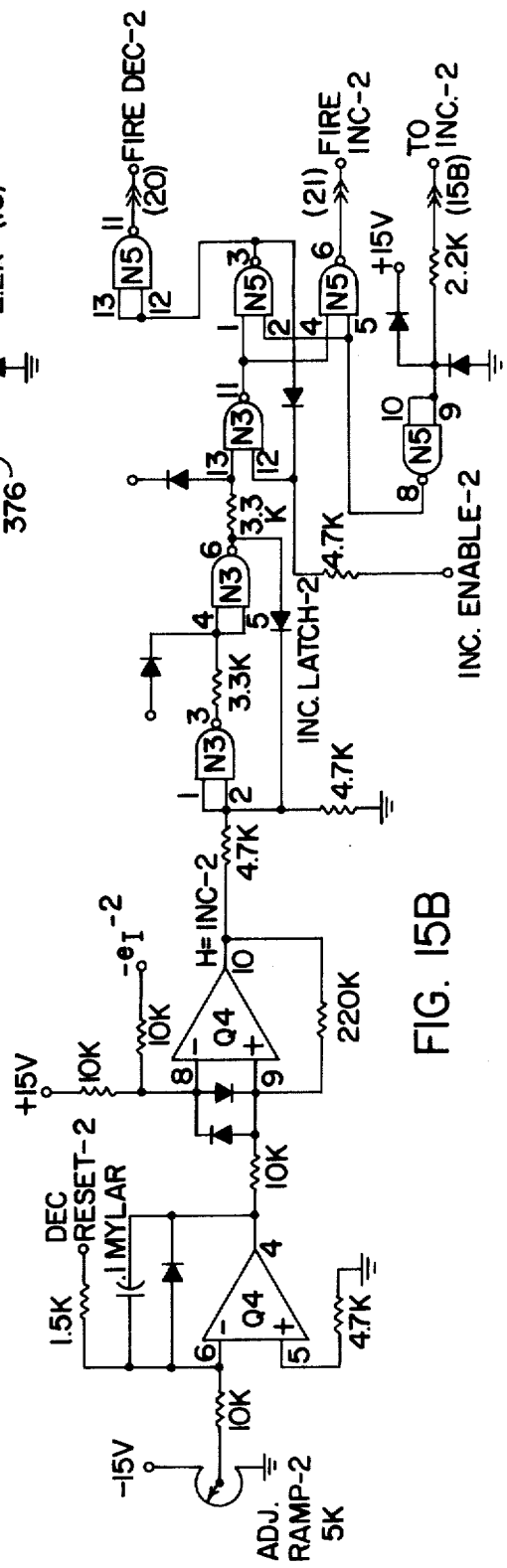

FIGS. 15A and 15B illustrate circuitry for generating firing pulses to the constant current source chopper SCR's. The output of amplifier 370 in FIG. 15A will be a sawtooth, and amplifier 372 will provide a square wave output by performing a threshold detection on the sawtooth. The threshold is variable in accordance with the error signal—$\epsilon_{I\text{-}1}$ from the output of amplifier 366 in FIG. 14, so that the duty cycle of the square wave output from amplifier 372 can be adjusted in accordance with this error signal. Assuming that INC-1 has been enabled by the circuitry of FIG. 12A, a high output from amplifier 372 will result in a firing signal being provided from NAND gate 374. At the end of the INC-1 firing pulse, the low level signal from the INC-1 pulse amplifier will then result in a high level signal at the output of gate 376 so that a subsequent DEC RESET-1 pulse will fire DEC-1. The RESET-1 pulse is generated by the circuit shown in FIG. 16A, with the input signal to the pulse amplifier in FIG. 16A being provided from terminal 380 in FIG. 10B.

Figure 16A:
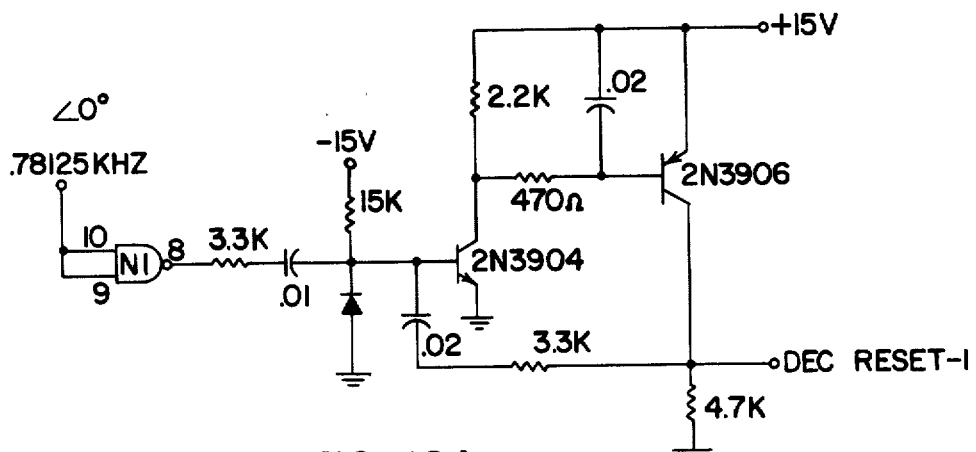
FIGS. 16A and 16B are schematic diagrams of circuits used to generate out-of-phase reset signals for chopper SCR's in the first and second constant current sources, respectively.
Figure 16B:
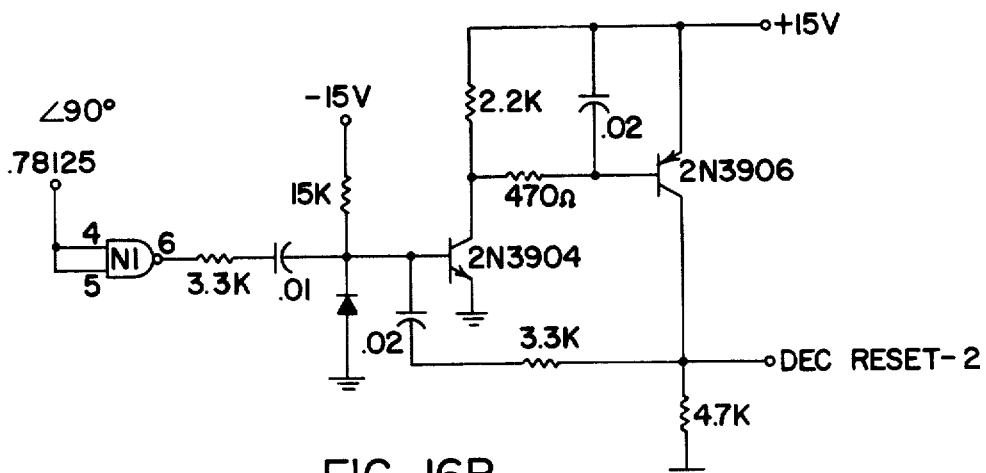

The operation of the circuitry in FIG. 15B is similar to that shown in FIG. 15A with the DEC RESET-2 pulse being provided by the pulse amplifier of FIG. 16B. The input to the pulse amplifier in FIG. 16B is provided from the output 382 in FIG. 10B and is shifted by 90 degrees with respect to the input to the pulse amplifier of FIG. 16A.

As described above, small saturable reactors are provided in series with each of the thyristors in order to prevent substantial reverse current spikes from damaging the thyristors. The possibility of current damage to the thyristors can be substantially further reduced by a novel firing control technique which will now be described. One of the limitations in using thyristor switching elements is the di/dt which any given thyristor is capable of handling. This is most serious when the thyristor is in a full forward conduction mode and it is turned off by applying a reverse bias across the thyristor. With the thyristor conducting a large forward current value, there is a relatively high concentration of carriers available, and these carriers can be instantly made to conduct a high reverse current in the opposite direction if a reverse potential is applied as is conventional in SCR inverters. At high current and power levels, this phenomenon can be extremely troublesome. Applicant has devised a technique for firing one pair of the diamond SCR's at a time when the magnitude of the forward current of the other conducting pair is at a minimum, thus decreasing the number of carriers available for reverse current conduction at the time the reverse potential is applied. This makes the SCR much easier to turn off and reduces the magnitude of a possible reverse current spike.

As discussed above, the voltage across the entire series diamond chain will have a frequency of 2 N times the switching frequency of any individual thyristor, where N is the number of diamond circuits in the chain. Thus, assuming a substantially 50 percent duty cycle for each individual thyristor, the voltage across the diamond chain will fluctuate N times during the "on" time of each thyristor, as can be seen by comparing FIGS. 5A and 5E. Due to this variation, the current through each SCR will fluctuate, and applicant has found that by firing an SCR when its forward current flow has fluctuated to a minimum value, the di/dt resulting from the applicaton of a reverse voltage will be minimized and the SCR can be turned off more quickly, and reverse recovery currents minimized.

FIG. 17 illustrates an approximate current waveform for an individual thyristor in a diamond chain inverter having two diamond circuits. The SCR is turned on at time $t_0$ at which time the current is at a substantially zero level, and the forward current flow through the thyristor then fluctuates according to a waveform substantially defined by 1—cos ωt. At time $t_1$ in FIG. 17, the forward current flow through the thyristor will have decreased to a minimum value, and firing the thyristor at this time will result in the smallest possible di/dt and the quickest turn-off time.

A simple technique for implementing this firing control is briefly illustrated in FIG. 18. If, for example, the resonant frequency of the load is approximately 50 kHz, and if the diamond chain consists of two diamond circuits connected in series, the operating frequency of each individual thyristor will be substantially 12.5 kHz. For the sake of simplicity, FIG. 18 illustrates the timing control circuitry for only a single one of the thyristors in the diamond chain. In FIG. 18, an oscillator 400 having a relatively high operating frequency, e.g. 100 kHz, will provide a source of pulses to the clock terminal input of a counter 402. The output of counter 402 is provided to a decoder 404 which provides an output pulse each time the counter 402 reaches a value of eight, so that the output pulse from decoder 404 will occur at a rate of 12.5 kHz. This output pulse will be provided through OR gate 406 to the pulse amplifier of the appropriate SCR. Thus, absent any further controls, the SCR will be switched at a 12.5 kHz rate and the overall diamond chain frequency will be 50 kHz.

A sensor 408 can be used to monitor the current through the appropriate thyristor and provide an output signal each time the current begins to inrease, thus indicating that the low point in the forward current level has just been reached. This sensor output signal could be provided through a suitable divide-by-two circuit for 10, e.g. a simple flip-flop, so that a firing pulse signal will be provided through the gate 406 to the appropriate pulse amplifier, and the counter 402 is simultaneously reset to provide synchronization between the sensor and counter. It is preferable to have the oscillator 400 operate at a frequency slightly below 100 kHz so that the output from divider 410 will reset the counter and provide the proper firing pulse immediately before the counter reaches the firing value of eight, and in this way the operating frequency of the diamond chain will be self-controlled, i.e. it will be automatically controlled to operate at substantially the resonant frequency of the load.

While only a single embodiment of the invention has been described and illustrated, it should be appreciated that a variety of changes could be made without departing from the spirit and scope of the invention. For example, the series chain of diamond circuits could be coupled in series with a transformer primary, with the secondary of the transformer supplying the current pulses to the resonant load. As long as a series diamond chain is employed as disclosed above, conventional SCR's can be used to generate very high frequency pulses to a resonant load while minimizing circuit complexity and cost.

What is claimed is:

1. A solid state frequency converter comprising:
   a diamond chain including a plurality of N diamond circuits coupled in series, each said diamond circuit comprising a capacitor having first and second terminals and first through fourth unidirectional switching elements each having input, output and control terminals and conducting from input to output in response to a control terminal signal, the input terminals of said first and third switching elements being coupled together to form a diamond circuit input terminal, the output terminals of said second and fourth switching elements being coupled together to form a diamond circuit output terminal, the output terminal of said first switching element and input terminal of said fourth switching element being coupled to said first capacitor terminal, and the output terminal of said third switching element and input terminal of said second switching element being coupled to said second capacitor terminal, said N diamond circuits being connected in series;
   constant current source means for providing a substantially constant current to said diamond chain;
   means for providing control signals to said switching elements, the control signals to said first and second switching elements in any one diamond circuit being substantially simultaneous, the control signals to said third and fourth switching elements in said one diamond circuit being substantially simultaneous and 180° out-of-phase with respect to said first and second switching element control signals, and the control signals in each said diamond circuit being shifted in phase with respect to the control signals provided to the switching elements in the remaining diamond circuits, thereby generating a voltage across the input and output terminals of said diamond chain which has a frequency of 2 N times the switching frequency of any one switching element; and a resonant load coupled to said diamond chain.

2. A solid state frequency converter as defined in claim 1, wherein said resonant load is coupled in series with a DC blocking capacitor having a capacitance value greater than the equivalent capacitance of said diamond chain capacitors whereby said DC blocking capacitor will pass to said resonant load only an AC component of the voltage across said diamond chain, the series connection of said DC blocking capacitor and resonant load being coupled in parallel with said diamond chain.

3. A solid state frequency converter as defined in claims 1 or 2, further comprising means for preventing the build-up of excessive voltage across said diamond chain.

4. A solid state frequency converter as defined in claim 3, wherein said protection means comprises an over voltage protection switching element having input, output and control terminals and conducting from input to output in response to an over voltage control signal; and means for generating said over voltage control signal in response to an excessive voltage across said diamond chain.

5. A solid state frequency converter as defined in claim 4, wherein said means for generating continues to generate said over voltage control signal even after the voltage across said diamond chain drops below said excessive voltage.

6. A solid state frequency converter as defined in claims 1 or 2, wherein the control signals to corresponding switching elements in different diamond circuits are offset in phase by 180/N degrees.

7. A solid state frequency converter as defined in claims 1 or 2, further comprising means for inhibiting the control signal applied to one of said first or third switching elements in at least one of the diamond circuits of said diamond chain to thereby hold the charge on the capacitor in said at least one diamond circuit.

8. An invertor to convert D.C. to high frequency A.C. for use with induction heating equipment, said inverter comprising: a diamond chain including a plurality of N diamond circuits coupled in series, each said diamond circuit comprising a capacitor having first and second terminals and first, second, third and fourth unidirectional switching elements each having input, output and control terminals and conducting from input to output in response to a control terminal signal, the input terminals of said first and third switching elements being coupled together to form a diamond circuit input terminal, the output terminals of said second and fourth switching elements being coupled together to form a diamond circuit output terminal, the output terminal of said first switching element and input terminal of said fourth switching element being coupled to said first capacitor terminal, and the output terminal of said third switching element and input terminal of said second switching element being coupled to said second capacitor terminal, said N diamond circuits being connected in series; power supply means for providing a substantially constant current to said diamond chain; trigger means for providing control signals to said switching elements; and, a generally resonant load coupled to said diamond chain.

9. An inverter as defined in claim 8 wherein said trigger means includes a sensor circuit for creating a sense signal at a time of low current flow through a portion of one of said diamond circuits, and means responsive to said sense signal for creating control signals to change the current flow through said one of said diamond circuits.

10. An inverter to convert D.C. to high frequency A.C., for use with induction heating equipment forming a resonant load having a given frequency, said inverter comprising N capacitors formed into a series circuit, wherein N is an integer greater than one; current source means for charging each of said N capacitors to a predetermined voltage level in either of two opposite directions by current flow through said series circuit; switching means for selectively controlling the direction of the current flow through each of said N capacitors between said opposite directions in response to a trigger signal whereby the voltage across said series circuit is pulsated; control means for producing a series of trigger signals in a preselected controlled sequence for each of said capacitor switching means; and means for coupling said pulsating series circuit across said resonant load.

11. An inverter as defined in claim 10 wherein said switching means in response to said control means changes the direction of said current flow through each of said N capacitors once during the period in which the direction of said current flow through all of said N capacitors is changed once.

12. An inverter as defined in claim 10 wherein said switching means in response to said control means, changes the direction of said current flow through a group of at least two of said N capacitors substantially simultaneously once during the period in which the direction of said current flow through all of said N capacitors is changed once.

* * * * *